United States Patent
Love et al.

(10) Patent No.: US 8,537,724 B2
(45) Date of Patent: Sep. 17, 2013

(54) RELAY OPERATION IN A WIRELESS COMMUNICATION SYSTEM

(75) Inventors: Robert T. Love, Barrington, IL (US); Jialing Liu, Palatine, IL (US); Vijay Nangia, Algonquin, IL (US); Ajit Nimbalker, Arlington Heights, IL (US); Ravikiran Nory, Palatine, IL (US); Kenneth A. Stewart, Grayslake, IL (US); Xiangyang Zhuang, Lake Zurich, IL (US)

(73) Assignee: Motorola Mobility LLC, Libertyville, IL (US)

( * ) Notice: Subject to any disclaimer, the term of this patent is extended or adjusted under 35 U.S.C. 154(b) by 399 days.

(21) Appl. No.: 12/405,952

(22) Filed: Mar. 17, 2009

(65) Prior Publication Data

US 2010/0238845 A1 Sep. 23, 2010

(51) Int. Cl.
*H04J 3/00* (2006.01)

(52) U.S. Cl.
USPC ............ 370/280; 370/294; 370/293; 370/328

(58) Field of Classification Search
USPC .......................... 370/280, 464, 294, 293, 328
See application file for complete search history.

(56) References Cited

U.S. PATENT DOCUMENTS

| | | | |
|---|---|---|---|
| 6,005,884 A | 12/1999 | Cook et al. | |
| 6,032,020 A | 2/2000 | Cook et al. | |
| 6,141,533 A | 10/2000 | Wilson et al. | |
| 6,240,077 B1 | 5/2001 | Vuong et al. | |
| 6,459,725 B1 | 10/2002 | Baker et al. | |
| 6,507,741 B1 | 1/2003 | Bassirat | |
| 6,529,486 B1 | 3/2003 | Barnes et al. | |
| 6,535,717 B1 | 3/2003 | Matsushima et al. | |
| 6,813,284 B2 | 11/2004 | Vayanos et al. | |
| 7,139,239 B2 | 11/2006 | McFarland | |
| 7,366,117 B2 | 4/2008 | Kim et al. | |
| 7,426,196 B2 | 9/2008 | Gopalakrishnan et al. | |
| 7,440,509 B2 | 10/2008 | Baum | |
| 7,706,415 B2 * | 4/2010 | Varma et al. | 370/535 |
| 7,734,655 B2 * | 6/2010 | Ando | 707/802 |
| 7,860,058 B2 * | 12/2010 | Suo et al. | 370/330 |

(Continued)

FOREIGN PATENT DOCUMENTS

| | | |
|---|---|---|
| EP | 1509051 A2 | 2/2005 |
| JP | 2003-531518 A | 10/2003 |

(Continued)

OTHER PUBLICATIONS

3GPP TS 36.211 V8.5.0 (Dec. 2008) 3rd Generation Partnership Project; Technical Specification Group Radio Access Network; Evolved Universal Terrestrial Radio Access (E-UTRA); Physical Channels and Modulation (Release 8).

(Continued)

*Primary Examiner* — Ricky Ngo
*Assistant Examiner* — Dewanda Samuel

(57) ABSTRACT

A method in a relay node operating in a time division duplex system wherein the relay node transmits downlink pilot timeslot information to a user terminal in a first temporal region of a special sub-frame, communicates with a base station during a second temporal region of the special sub-frame, and configures a third temporal region of the special sub-frame, wherein the second temporal region is configured as a guard period for communications between the relay node and the user terminal.

12 Claims, 5 Drawing Sheets

(56) References Cited

U.S. PATENT DOCUMENTS

| | | | |
|---|---|---|---|
| 7,975,199 B2 * | 7/2011 | Chindapol et al. | 714/751 |
| 7,986,681 B2 * | 7/2011 | Astely et al. | 370/341 |
| 8,000,648 B2 * | 8/2011 | Yoshida et al. | 455/7 |
| 8,040,826 B2 * | 10/2011 | Lee et al. | 370/293 |
| 2003/0153276 A1 | 8/2003 | Terry et al. | |
| 2003/0171129 A1 | 9/2003 | Sagne | |
| 2003/0202562 A1 | 10/2003 | Cai | |
| 2004/0042492 A1 | 3/2004 | Suzuki et al. | |
| 2004/0082356 A1 | 4/2004 | Walton et al. | |
| 2004/0085934 A1 | 5/2004 | Balachandran et al. | |
| 2004/0162075 A1 | 8/2004 | Malladi et al. | |
| 2004/0266339 A1 | 12/2004 | Larsson | |
| 2005/0018754 A1 | 1/2005 | Song | |
| 2005/0053088 A1 | 3/2005 | Cheng et al. | |
| 2005/0068973 A1 | 3/2005 | Taffin et al. | |
| 2006/0106600 A1 | 5/2006 | Bessette | |
| 2007/0058595 A1 | 3/2007 | Classon et al. | |
| 2007/0153734 A1 * | 7/2007 | Lee et al. | 370/329 |
| 2008/0095038 A1 * | 4/2008 | Chang et al. | 370/208 |
| 2008/0240022 A1 | 10/2008 | Yoon et al. | |
| 2008/0247337 A1 | 10/2008 | Li et al. | |
| 2009/0180435 A1 * | 7/2009 | Sarkar | 370/330 |
| 2012/0002576 A1 * | 1/2012 | Zhang et al. | 370/280 |

FOREIGN PATENT DOCUMENTS

| | | |
|---|---|---|
| WO | 0108 475 A1 | 10/2001 |
| WO | 2004068876 A1 | 8/2004 |
| WO | 2006023771 A2 | 3/2006 |

OTHER PUBLICATIONS

3GPP TSG RAN WG Meeting #55bis, Ljubljana, Jan. 12-16, 2009; R1-090244 Considerations on TDD Relay.

3GPP TSG RAN WG Meeting #55bis, Ljubljana, Jan. 12-16, 2009; R1-090225 UL Subframe Stealing for In-Band Relaying in TDD Mode.

3GPP TSG RAN WG Meeting #56, Athens, Greece, Feb. 9-13, 2009; R1-090807 Summary of Design Considerations for Supporting Relays in TDD and FDD Modes.

3GPP TSG RAN WG Meeting #56, Athens, Greece, Feb. 9-13, 2009; R1-090827 Summary and Proposal of Relay Frame Structure.

Das, A. et al.: A2IR: an asynchronous and adaptive hybrid ARQ scheme for 3G evolution, Vehicular Technology Conference, 2001, VTC 2001 Spring, IEEE VTS 53rd vol. 1, May 6-9, 2001, pp. 628-632, vol. 1.

Das, A. et al.: Performance of hybrid ARQ for high speed downlink packet access in UMTS, Vehicular Technology Conference, 2001, VTX 2001 Fall, IEEE VTS 54th vol. 4, Oct. 7-11, 2001, pp. 2133-2137, vol. 4.

Das, A. et al.: Adaptive, asynchronous incremental redundancy (A/sup 2/IR) with fixed transmission time intervals (TTI) for HSDPA, Personal, Indoor and Mobile Radio Communications, 2002, The 13th IEEE International Symposium on vol. 3, Sep. 15-18, 2002, pp. 1083-1087, vol. 3.

3G: 3rd Generation Partnership Project 2 "3GPP2", Physical Layer Standard for cdma2000 Spread Spectrum Systems, Revision D, 3GPP2 C.S0002-D, Version 1.0 Feb. 13, 2004, pp. 3-3, 3-15, 3-21, 3-131 to 3-140.

3G: 3rdd Generation Partnership Project 2 "3GPP2", cdma2000 High Rate Packet Data Air Interface Specification, 3GPP2 C.s0024-A Version 1.0 Mar. 2004, pp. 3127 to 3-31, 13-1 to 13-13, 13-25 to 13-52.

IEEE Std 802.16/2004 (Revision of IEEE Std 802.16-2001), 806.16 IEEE Standard for Local and metropolitan area networks, Part 16: Air Interface for Fixed Broadband Wireless Access Systems, IEEE Computer Society and the IEEE Microwave Theory and Techniques Society, Oct. 1, 2004, pp. 46, 86, 427, 460, 494-505, 520-521, 548-549, 659.

Bluetrees-Scatternet Formation to Enable Bluetooth-Based Ad Hoc Networks. G V Zaruba, S Basagni and I Chlamtac.

3GPP RAN WG1#55; Prague, Czech Republic; Nov. 10-14, 2008; R1-084384; Support of Rel-8 UEs by LTE-A Relays, Qualcomm Europe.

3GPP TSG RAN1 #56, Athens, Greece, Feb. 9-13, 2009; R1-090xxx; Frame Structure and Signaling to Support relay Operation, Motorola.

PCT Search Report; PCT/US2010/026478 counterpart U.S. Appl. No. 12/405,952; May 25, 2010 15 pages.

3GPP TSG RAN WG1 Meeting #56bis; Seoul, Korea, Mar. 23-27, 2009; Relay Frame Structure Design of TDD Mode; R1-091270; 10 pages.

3GPP TSG RAN WG1 meeting #56bis; Seoul, Korea, Mar. 23-27, 2009; Considerations for TDD Relay Fram Structure; R1-091523; 6 pages.

3GPP TR 36.814 V0.4.1 (Feb. 2009); 3rd Generation Partnership Project; Technical Specification Group Radio Access Network; Further Advancements for E-UTRA; Physical Layer Aspects (Release 9); 32 pages.

3GPP TSG-RAN WG1 #56 bis; Mar. 23-27, 2009; Seoul, Korea; Access-Backhaul Partitioning; R1-091457; 4 pages.

3GPP TSG RAN WG1 Meeting #58; Shenzhen, China; Aug. 24-28, 2009; Backhaul options for Type 1 Relays for TDD LTE-A; R1-093412; 1 page.

3GPP TSG RAN WG1 Meeting #57; San Francisco, USA May 4-8, 2009; Backhaul options for Type 1 Relays for TDD LTE-A; R1-091942; 1 page.

Dohler, et al; Distributed PHY-layer mesh networks; 14th IEEE Proceedings on Personal, Indoor and Mobile Radio Communications, 2003; USA, IEEE, Sep. 7, 2003, vol. 3, pp. 2543-2547.

Zimmermann et al.; On the performance of cooperative diversity protocols in practical wireless systems, IEEE 58th Vehicular Technology Conference, 2003., USA, IEEE, Oct. 6, 2003, vol. 4, pp. 2212-2216.

Janani et al.; Coded cooperation in wireless communications: space-time transmission and iterative decoding, IEEE Transactions on Signal Processing, IEEE Transactions on (see also Acoustics, Speech, and Signal Processing, USA, IEEE, Feb. 2004, vol. 52, Issue 2, pp. 362-371.

Hunter et al.; Coded cooperation under slow fading, fast fading, and power control, Conference Record of the Thirty-Sixth Asilomar Conference on Signals, Systems and Computers, 2002., USA, IEEE, Nov. 3, 2002, vol. 1, pp. 118-122.

Miyano et al.; Space time coded cooperative relaying technique for multihop communications, IEEE 60th Vehicular Technology Conference, 2004, USA, IEEE, Nov. 26, 2004, vol. 7, pp. 5140-5144.

Japanese Patent Office; Notification of Reasons for Rejection Jan. 21, 2010; Japanese Patent Application No. 2007-528057; Method and Appratus for Transparent Relaying; Motorola related PCT Publication No. W02006023771; 5 pages.

3GPP TS 36.213 V8.4.0 (Sep. 2008); 3rd Generation Partnership Project; Technical Specification Group Radio Access Network; Evolved Universal Terrestrial Radio Access (E-UTRA); Physical Layer procedures (Release 8); 60 pages.

* cited by examiner

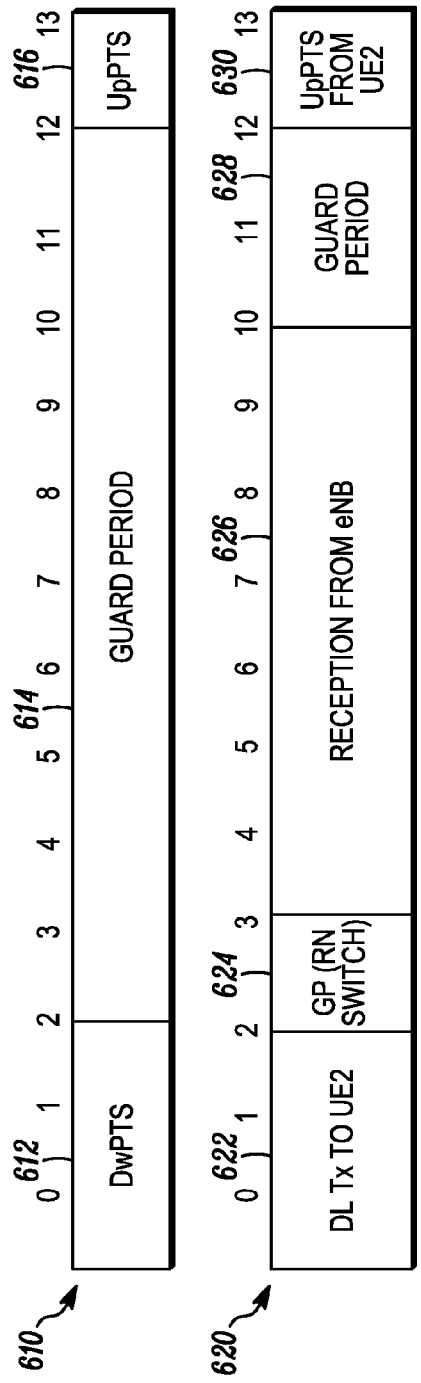
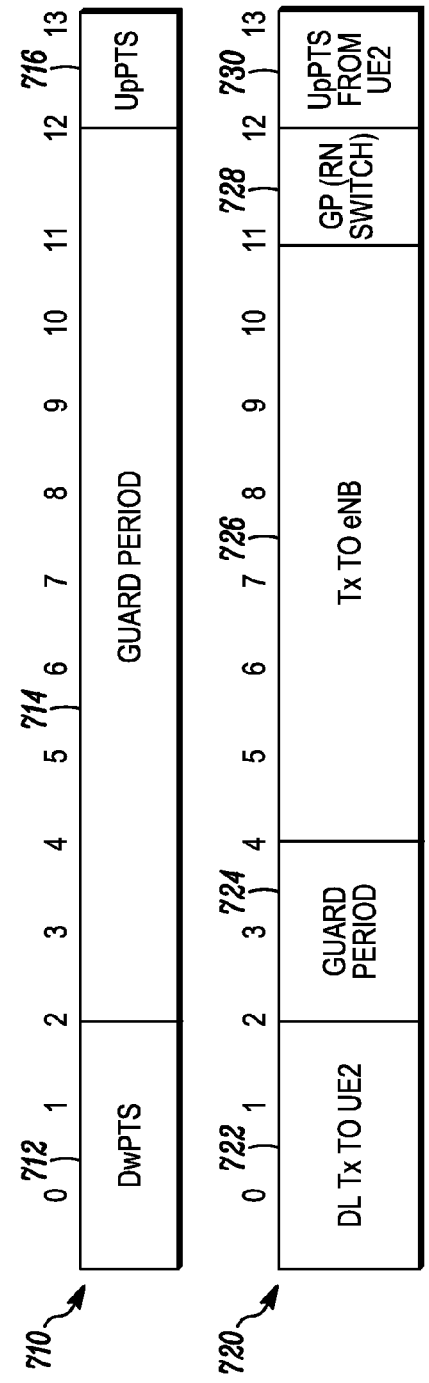
FIG. 6
FIG. 7

RELAY OPERATION IN A WIRELESS COMMUNICATION SYSTEM

FIELD OF THE DISCLOSURE

The present disclosure relates generally to wireless communications and more particularly to relay operations in wireless communication systems.

BACKGROUND

In Wireless Communications networks, for example, in Third Generation Partnership Project Long Term Evolution Advanced (3GPP LTE-Advanced), there is a need to develop solutions that can provide a better user experience while reducing the cost of infrastructure. Deployment of relay nodes is one such method wherein the base station (or eNB) communicates with a user equipment (UE) with the help of an intermediate relay node (RN), for example, when the distance between eNB and UE exceeds the radio transmission range of the nodes, or a physical barrier or radio frequency (RF) obstruction is present between the eNB and UE to degrade the channel quality. Generally, there can be more than one RN communicating data between an eNB and UE. In such situations, each intermediate node routes packets, e.g., data and control information, to the next node along the route until the packets reach their final destination.

Networks implementing single hop links between an eNB and a UE can severely stress link budgets at the cell boundaries and often render the users at the cell edge incapable of communicating or using higher data rates. Pockets of poor-coverage areas or coverage holes are created where communication becomes increasing difficult. This in turn brings down the overall system capacity as well as induces user service dissatisfaction. While such coverage voids can be avoided by deploying additional eNBs this significantly increases both the capital expenditure (CAPEX) and operational expenditure (OPEX) for the network deployment. A more cost effective solution is to deploy relay nodes (RNs) (also known as relays or repeaters) in areas with poor coverage and repeat transmissions so that subscribers in these coverage areas can be served better.

Even with the deployment of relays within a network, there remain some mechanisms that can further reduce costs. Typically, the RN not only provides an access link for delivering traffic to and from the UEs but it also routes this traffic (wirelessly) through the donor eNB and, hence, also supports a backhaul link. The RN thus uses the same resources (e.g., frequency, time, spatial, spreading codes, etc.) as a typical UE being served by the eNB. At the same time, the RN is expected to act as an infrastructure entity to serve another set of users (hereby referred to as UE2). A RN that shares the same resources as a UE is referred to an in-band RN while an out-of-band RN does not share resources with a UE.

In a relay node based upon the 3GPP Universal Mobile Telecommunications System (UMTS) LTE Release 8 (Rel-8) wireless communication system, the RN in time division duplex (TDD) mode is required to enable up to four links; two backhaul links (eNB to relay, relay to eNB) and two access links (relay to UE, UE to relay). To reduce complexity and interference, it is preferable for the relay to not be simultaneously (or concurrently) transmitting and receiving in the same frequency band. Thus, for instance, the relay cannot transmit to the eNB and receive from the UE concurrently and hence the eNB to relay and the relay to UE links must be time-multiplexed with a sufficient switching gap provided at the relay node. Furthermore, the relay design should be backward-compatible.

The RN can signal a Multimedia Broadcast multicast service Single Frequency Network (MBSFN) sub-frame in the downlink to a UE served by the RN to inform the UE that it does not receive downlink data transmissions, e.g., via the Physical Downlink Shared Channel (PDSCH), of the MBSFN sub-frame. The UE served by the RN also does not monitor reference symbols (e.g., for CQI or handoff measurements) outside of the control region of the MBSFN sub-frame transmitted to the UE. Thus, the RN can communicate with the eNB in the time-interval corresponding to the portion of the MBSFN when the UE is not expecting data from the RN. Furthermore, in a Time-Division Duplex (TDD) system, the relay and eNB may have different UL/DL configurations, wherein each configuration specifies a split of the resources (time resources) as downlink or uplink. Thus, there are several problems for designing the access/backhaul design depending on the configuration. For example, if there are no sub-frames that can be labeled as MBSFN for a configuration, then it may be difficult to design an eNB to RN link. Similarly, if both eNB and RN are in the uplink mode, then it is difficult to schedule the RN to do uplink transmission as it might lead to a loss of the acknowledgements from the UE transmitting to the relay. Furthermore, if two different configurations are used in the eNB (say uplink) and RN (downlink), then the RN DL control region can potentially interfere with uplink transmissions from UEs to the eNB. Therefore, there is a need to address the problem of interference as well as backhaul design for relay operating in TDD mode.

The various aspects, features and advantages of the invention will become more fully apparent to those having ordinary skill in the art upon a careful consideration of the following Detailed Description thereof with the accompanying drawings described below. The drawings may have been simplified for clarity and are not necessarily drawn to scale.

BRIEF DESCRIPTION OF THE DRAWINGS

FIG. 6 illustrates a special sub-frame configuration enabling the RN to receive from the eNB during a UE guard period.

FIG. 7 illustrates a special sub-frame configuration enabling the RN to transmit to the eNB during a UE guard period.

DETAILED DESCRIPTION

Figure 1:
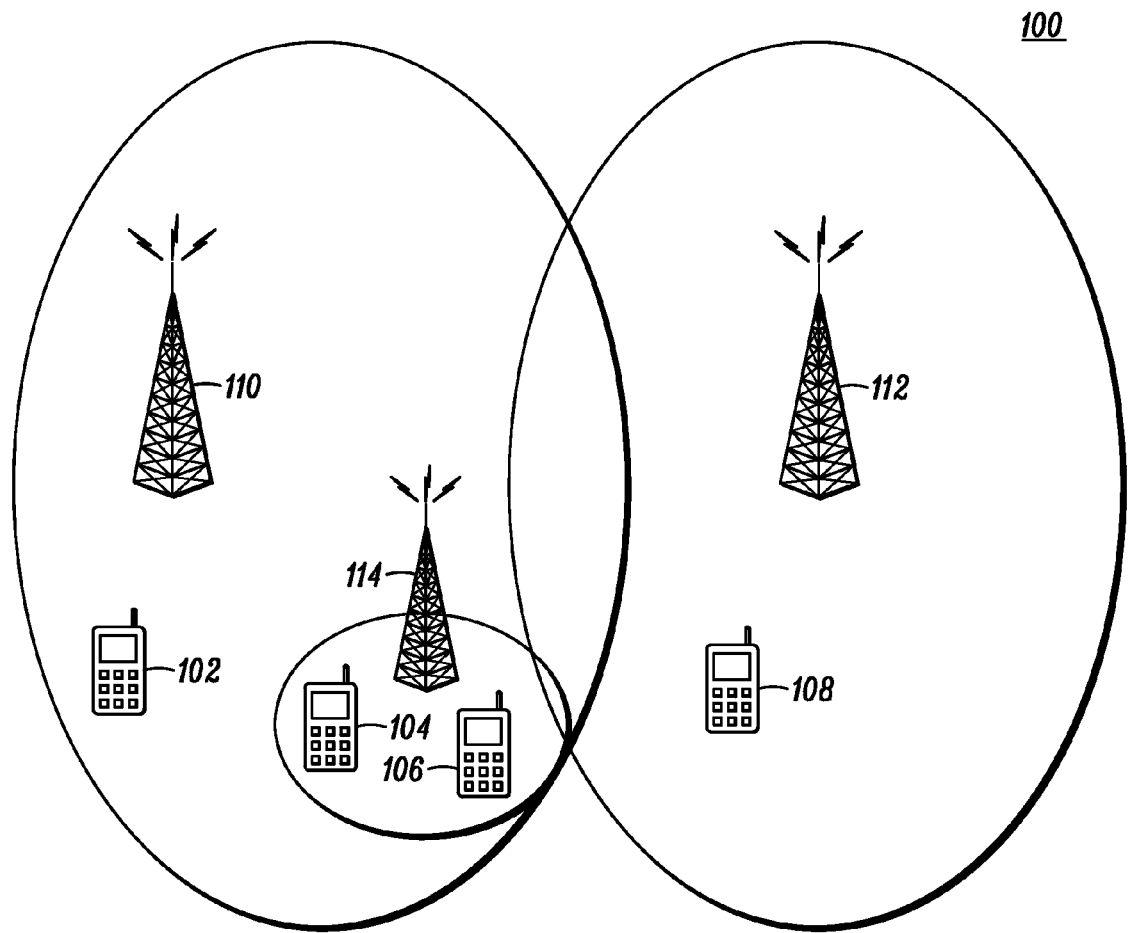
FIG. 1 illustrates a wireless communication system.

In FIG. 1, a wireless communication system 100 comprises a network of fixed base infrastructure units, for example, base units 110 and 112 distributed over a geographical region. A base unit may also be referred to as an access point, access terminal, base, base station, Node-B, eNode-B (eNB), Home Node-B, relay node, or by other terminology used in the art. The one or more base units each comprise one or more transmitters for downlink transmissions and one or more receivers for uplink transmissions. The base units are generally part of a radio access network that includes one or more controllers communicably coupled to one or more corresponding base units. The access network is generally communicably coupled to one or more core networks, which may be coupled to other networks, like the Internet and public switched telephone networks, among other networks. These and other elements of access and core networks are not illustrated but they are well known generally by those having ordinary skill in the art.

In one implementation, the wireless communication system is compliant with the developing Long Term Evolution (LTE) of the Third Generation Partnership Project (3GPP) Universal Mobile Telecommunications System (UMTS) protocol, also referred to as EUTRA or Release-8 (Rel-8) 3GPP LTE wherein the base unit transmits using an orthogonal frequency division multiplexing (OFDM) modulation scheme on the downlink and the user terminals transmit on the uplink using a single carrier frequency division multiple access (SC-FDMA) scheme. More generally, however, the wireless communication system may implement some other open or proprietary communication protocol, for example, WiMAX, among other protocols. The present disclosure is not intended to be limited to the implementation of any particular wireless communication system architecture or protocol.

Figure 2:
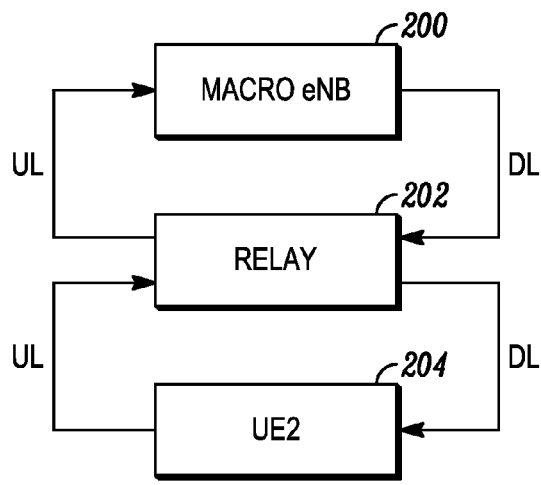
FIG. 2 illustrates links between a relay node (RN), a base station (eNB) and a user terminal (UE).

In FIG. 1, the one or more base units serve a number of remote units within a serving area, for example, a cell or a cell sector via a wireless communication link. The remote units may be fixed units or mobile terminals. The remote units may also be referred to as subscriber units, mobiles, mobile stations, users, terminals, subscriber stations, user equipment (UE), user terminals, or by other terminology used in the art. The remote units also comprise one or more transmitters and one or more receivers. In FIG. 1, generally, the base unit 112 transmits downlink communication signals to serve remote unit 102 in the time and/or frequency and/or spatial domain. The remote unit 102 communicates directly with base unit 110 via uplink communication signals. The remote units 104 and 106 communicate with the base unit (or Macro eNB) 100 via relay node 114. A remote unit 108 communicates directly with base unit 112. In FIG. 2, a Relay Node (RN) 202 shares the same downlink (DL) and uplink (UL) resources (frequency, time, spatial, spreading codes, etc.) as a UE that is served by the Macro eNB 200. At the same time, the Relay acts as an infrastructure entity to serve another UE 204 (UE2). The traffic between relay node (RN) and the base unit is known as the backhaul.

Figure 3:
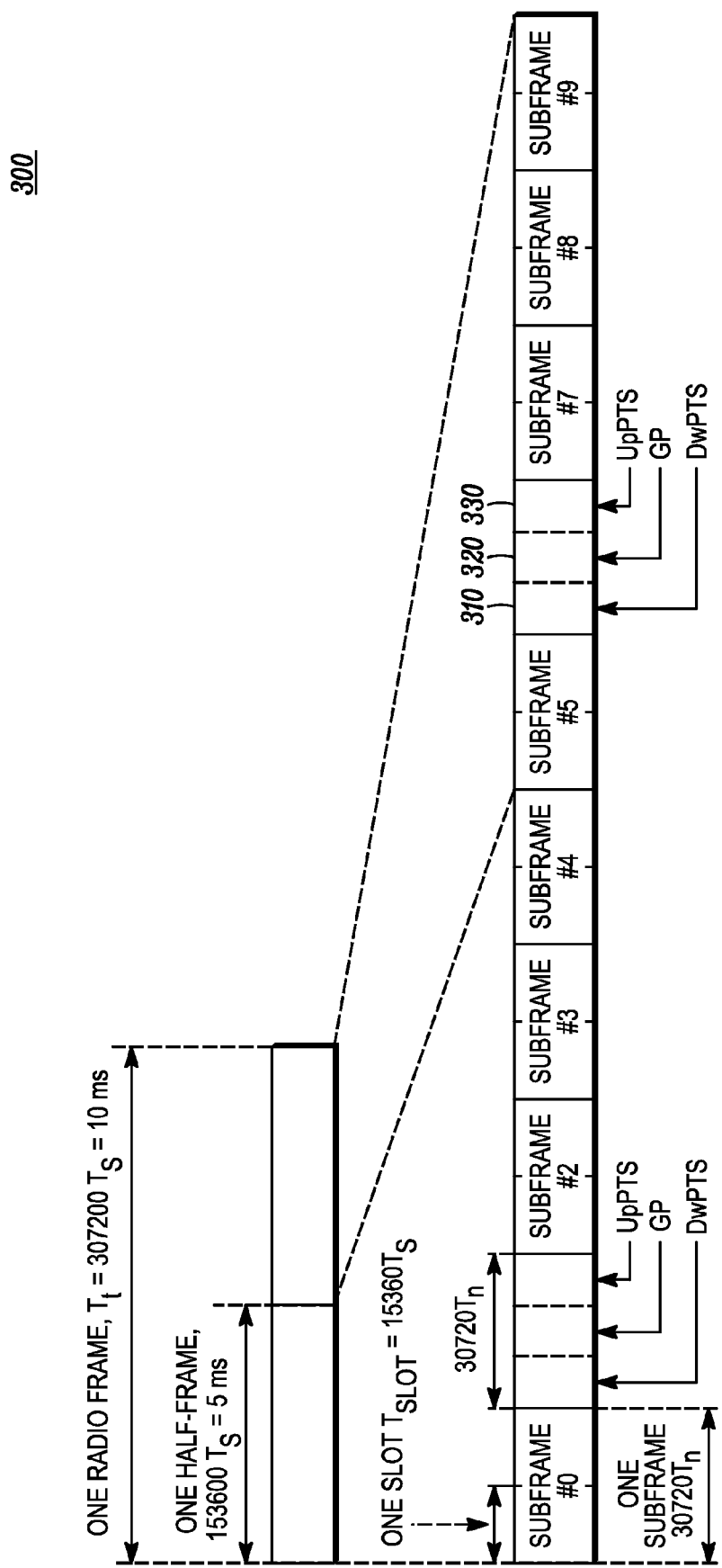
FIG. 3 illustrates a prior art radio frame and special sub-frame.

In one implementation, a relay node (RN) operating in a time division duplex mode transmits one or more special sub-frames to an eNB. In one particular implementation, the special sub-frame constitutes part of a Type 2 frame Structure applicable to time division duplex (TDD) mode operation specified in 3GPP TS 36.211, v8.5.0, section 4.2. FIG. 3 illustrates a radio frame 300 divided into two half-frames comprising sub-frames 0-9. The frame structure is comprised of a 10 millisecond (ms) Radio frame, which is in turn divided into ten sub-frames, each of 1 ms duration, wherein each sub-frame is divided into two slots of 0.5 ms each, wherein each slot contains a number of OFDM or SC-FDMA symbols. In one embodiment, the special sub-frame corresponds to sub-frame 1 in the radio frame. In another embodiment, the special sub-frame corresponds to sub-frame 6 in the radio frame. And in yet another embodiment, the special sub-frame corresponds to sub-frames 1 and 6 in the radio frame. The exemplary sub-frame locations are consistent with the Uplink-downlink configurations specified in 3GPP TS 36.211, v8.5.0, section 4.2. In other embodiments however, the special sub-frame may be located at one or more other locations with the radio frame. In FIG. 3, the 3GPP TS 36.211, v8.5.0, section 4.2 sub-frames 1 and 6 are special sub-frames each of which is characterized by a first temporal region 310 comprising downlink pilot timeslot (DwPTS) information, a second temporal region 320 constituting a guard period (GP), and third temporal region 330 comprising uplink pilot timeslot (UwPTS). In other embodiments, the special sub-frame has various advantageous configurations to serve the backhaul between the eNB and the RN as discussed further below. The downlink and uplink bandwidth are subdivided into resource blocks, wherein each resource block comprises one or more sub-carriers. A resource block (RB) is typical unit in which the resource allocations are assigned for the uplink and downlink communications. Furthermore, the eNB configures appropriate channels for uplink and downlink control information exchange.

In one embodiment, the special sub-frame is configured as a portion of a radio frame that includes at least one Multimedia Broadcast multicast service Single Frequency Network (MBSFN) sub-frame. In the exemplary 3GPP LTE Rel-8 implementation, whether the radio frame includes MBSFN sub-frames depends on the Uplink-downlink configuration specified in 3GPP TS 36.211, V8.5.0 Section 4.2. For example, sub-frame 9 includes a MBSFN sub-frame in configuration 5. An MBSFN sub-frame may be included in other sub-frames of the radio frame for other configurations. An LTE Rel-8 TDD UE assumes the following with respect to the frame structure: MBSFN sub-frames can be any (one or more) downlink sub-frame excluding those sub-frames numbered #0, #1, #5, #6 in a Radio Frame. The MBSFN configuration in a radio frame is signaling by a System Information Broadcast (SIB) message.

Figure 4:
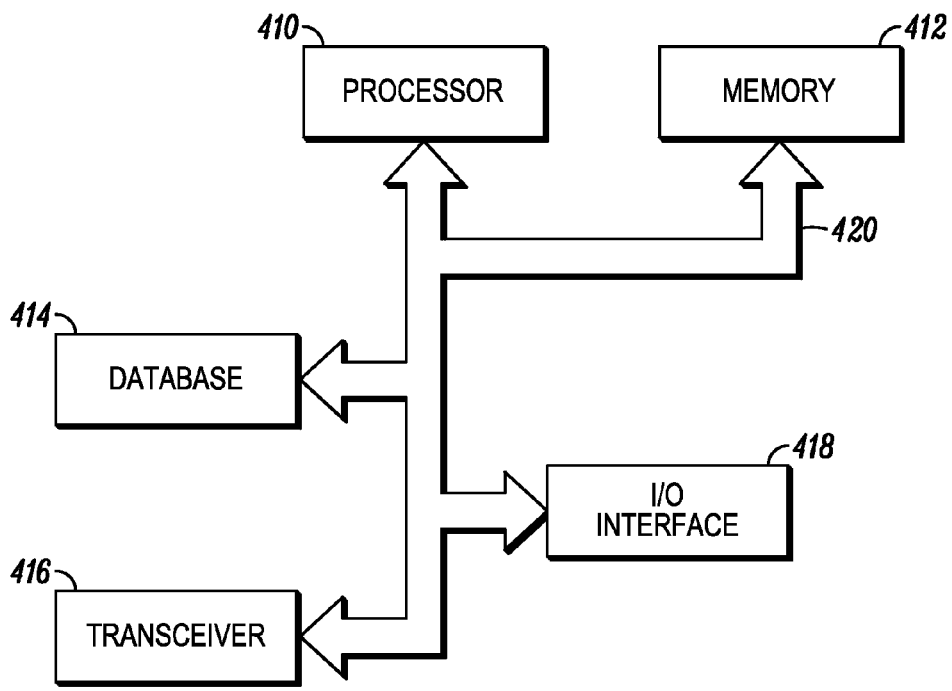
FIG. 4 illustrates a schematic block diagram of a relay node.

In FIG. 4, a relay node (RN) 400 comprises a controller/processor 410 communicably coupled to memory 412, a database 414, a transceiver 416, input/output (I/O) device interface 418 connected through a system bus 420. The RN may implement any operating system including, but not limited to Microsoft Windows®, UNIX, or LINUX. Client and server software may be written in any programming language, such as C, C++, Java or Visual Basic, for example. The server software may run on an application framework, such as, for example, a Java® server or .NET® framework.

In FIG. 4, the controller/processor 410 may be any programmed processor known to one of skill in the art. However, the functionality described herein may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In FIG. 4, the memory 412 may include volatile and nonvolatile data storage, including one or more electrical, magnetic or optical memories such as a random access memory (RAM), cache, hard drive, firmware or other memory device. The memory may have a cache to speed access to specific data. The memory may also be connected to a compact disc read only memory (CD-ROM), digital video disc read only memory (DVD-ROM), DVD read write input, tape drive, or other removable memory device that allows media content to be directly uploaded into the system. Data may be stored in the memory or in a separate database. The database interface 414 may be used by the controller/processor to access the database. The transceiver 416 is capable of communicating with user terminals and base stations pursuant to the wireless communication protocol implemented. The I/O device interface 418 connects to one or more input devices that may include a keyboard, mouse, pen-operated touch screen or monitor, voice-recognition device, or any other device that accepts input. The I/O device interface may also connect to one or more output devices, such as a monitor, printer, disk drive, speakers, or any other device provided to output data.

Figure 5:
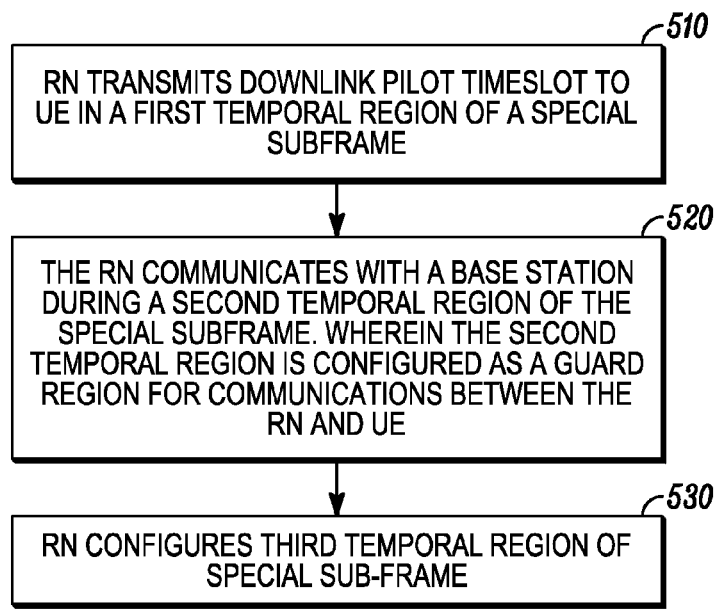
FIG. 5 illustrates a process diagram for communications between the RN, UE and eNB.

According to one aspect of the disclosure, the relay node performs functionality illustrated in the process diagram 500 of FIG. 5. In one implementation this functionality is performed by a processor or controller executing instructions such as program modules, routines, objects, components, data structures stored in memory wherein the processor or controller performs particular tasks or implements corresponding functions. Alternatively, this functionality may be performed by equivalent hard elements or a combination of hardware and software elements.

In FIG. 5, at 510, the RN transmits downlink pilot timeslot (DwPTS) information to a user terminal (UE) in a first temporal region of a special sub-frame. Such a UE is served by the RN. According to this aspect of the disclosure, at 520 the RN also communicates with eNB during a second temporal region of the special sub-frame. The communication between the RN and eNB during the second temporal region of the special sub-frame may be uplink or downlink communications as discussed further below. Moreover, the communication between the RN and eNB does not necessarily occur during the full duration of the second temporal region. The second temporal region of the sub-frame is configured as a guard period (GP) for communications between the RN and the UE. To enable a backward compatible relay design, for example, where the backhaul and access links are compatible with the existing Rel-8 specification, the special sub-frame configuration indicated/signaled to the UE served by the RN is one of the special sub-frame configurations specified in 3GPP TS 36.211, v8.5.0, section 4.2. The preferred special sub-frame configuration is configuration 0 or 5 for the normal cyclic prefix in the downlink case and configuration 0 or 4 for the extended cyclic prefix in the downlink case. The eNB can also signal a special sub-frame configuration that may or may not be different from that of the RN. In one example, the eNB signals the same special sub-frame configuration as the RN. The eNB may have multiple special sub-frames in the radio frame with potentially different special sub-frame configurations. Some of the special sub-frames may be used to multiplex and serve multiple RNs while others may be used to serve UEs connected to the eNB. The uplink-downlink configuration of the RN and eNB may be the same or different. In the preferred embodiment, the same uplink-downlink configuration is used for the RN and eNB. At 530, the third temporal region of the special sub-frame is also configured by the RN as discussed further below. In one embodiment, the RN configures the third temporal region of the special sub-frame as an uplink pilot timeslot for communications between the relay node and the user terminal. In another embodiment, the RN configures the third temporal region of the special sub-frame as a guard period. The Rel-8 special sub-frame configuration indicated/signaled to the UE served by the RN includes an uplink pilot timeslot of duration 1 or 2 OFDM symbols in the third temporal region, however, the RN can schedule no uplink transmissions (e.g., Sounding Reference Signal (SRS), Random Access Channel Signal (RACH)) in one (e.g., second) or both OFDM periods in effect creating a guard period in the third temporal region. Some exemplary examples are discussed more fully below.

In one implementation illustrated in FIG. 6 the RN receives information from the eNB during a portion of the second temporal duration of the special sub-frame. The information received from the eNB may be control information and/or data. As noted above, the second temporal region of the special sub-frame is configured as a guard period (GP) for communications between the RN and the UE. The configuration of the second temporal region, corresponding to the guard period for the UE, of the special sub-frame that enables the RN to receive from the eNB is discussed below.

In FIG. 6, from the perspective of communications between the UE and RN, the special sub-frame is configured as illustrated in special sub-frame 610. Symbols 0-2 of the special sub-frame 610 are allocated to the downlink pilot timeslot (DwPTS) 612, symbols 3-12 are allocated to the guard period (GP) 614 associated with RN/UE communications, and symbol 13 is allocated to the uplink pilot timeslot (UpPTS) 616. This corresponds to special sub-frame configuration 0 for the normal and extended cyclic prefix case as specified in 3GPP TS 36.211, v8.5.0, section 4.2. In other embodiments more or less symbols may be allocated to the DwPTS and UpPTS than illustrated in FIG. 6.

In FIG. 6, from the perspective of communications between the RN, UE and eNB, the special sub-frame is configured as illustrated at special sub-frame 620. Symbols 0-2 of the special sub-frame 620 are allocated to the downlink pilot timeslot (DwPTS) 622 for downlink communications from the RN to the UE. Symbol 3 is allocated to a guard period 624 during which the RN switches from transmit mode to receive mode. Symbols 4-10 are allocated for reception from the eNB during reception duration 626. Symbols 11-12 are allocated to a guard period 628 during which the RN switches from a configuration for receiving from the eNB to a configuration for receiving from the UE. During this guard period 628 the eNB switches from a configuration for transmitting to the RN to a configuration for receiving from the UE. Symbol 13 is allocated to the uplink pilot timeslot 630 during which the RN receives from the UE. Thus according to this embodiment, the RN configures the second temporal region corresponding to the guard period 614 of the special sub-frame 610 into the first guard period 624, the reception duration 626 during which the RN receives from the eNB, and the second guard period 628.

The size of the second temporal region allocated for reception from the eNB depends on the cell size and the transmission to reception (and vice versa) switching time. The switching times may be different for the eNB and RN. The guard periods may also include propagation delays and/or possible required timing advance.

The operation of the eNB is analogous to that of the RN: downlink communications from the eNB to the UE served by the eNB in a first temporal region DwPTS 612 symbols 0-2 of a special sub-frame 610; configuring the second temporal region of the special sub-frame corresponding to guard period 614 into first guard period symbol 3, downlink transmission to RN during Symbols 4-10, and second guard period symbols 11-12; third temporal region UpPTS 616 during which the eNB receives from its served UE.

In one embodiment, the special sub-frame is configured as a portion of a radio frame configured as time division duplex uplink/downlink configuration 0 pursuant to 3GPP TS 36.211, V8.5.0, 4.2. In one embodiment, the special sub-frame is configured as a portion of a radio frame configured as time division duplex uplink/downlink configuration 5 pursuant to 3GPP TS 36.211, V8.5.0, 4.2.

In another implementation, illustrated in FIG. 7, the RN transmits information to the eNB during a portion of the second temporal duration of the special sub-frame. The information transmitted to the eNB may be control information and/or data. As noted above, the second temporal region of the special sub-frame is configured as a guard period (GP) for communications between the RN and the UE. The configuration of the second temporal region, corresponding to the guard period for the UE, of the special sub-frame that enables the RN to transmit to the eNB is discussed below.

In FIG. 7, from the perspective of communications between the UE and RN, the special sub-frame is configured as illustrated at special sub-frame 710. Symbols 0-2 of the special sub-frame 710 are allocated to the downlink pilot timeslot (DwPTS) 712, symbols 3-12 are allocated to the guard period (GP) 714 associated with RN/UE communications, and symbol 13 is allocated to the uplink pilot timeslot (UpPTS) 716. In other embodiments more or less symbols may be allocated to the DwPTS and UpPTS than illustrated in FIG. 7.

In FIG. 7, from the perspective of communications between the RN, UE and eNB, the special sub-frame is configured as illustrated at special sub-frame 720. Symbols 0-2 of the special sub-frame 720 are allocated to the downlink pilot timeslot (DwPTS) 722 for downlink communications from the RN to the UE. Symbols 3-4 are allocated to a guard period 724 during which the RN switches from a configuration for transmitting to the UE to a configuration for transmitting to the eNB. During this guard period, the eNB switches from a configuration for transmitting to the UE served by the eNB to receiving from the RN. Symbols 5-11 are allocated for transmission to the eNB during transmission duration 726. Symbol 12 is allocated to a guard period 728 during which the RN switches from transmission mode to reception mode. Symbol 13 is allocated to the uplink pilot timeslot 730 during which the RN receives from the UE. Thus according to this embodiment, the RN configures the second temporal region corresponding to the guard period 714 of the special sub-frame 710 into the first guard period 724, the reception duration 726 during which the RN transmits to the eNB, and the second guard period 728.

The operation of the eNB is analogous to that of the RN. Downlink communications from the eNB to the UE are served by the eNB in a first temporal region DwPTS 712 corresponding to symbols 0-2 of a special sub-frame 710. The second temporal region of the special sub-frame is configured corresponding to guard period 714 into first guard period symbol 3-4, uplink reception from RN during symbols 5-11, and second guard period symbol 12. A third temporal region includes UpPTS 716 during which the eNB receives from its served UE.

Figure 8:
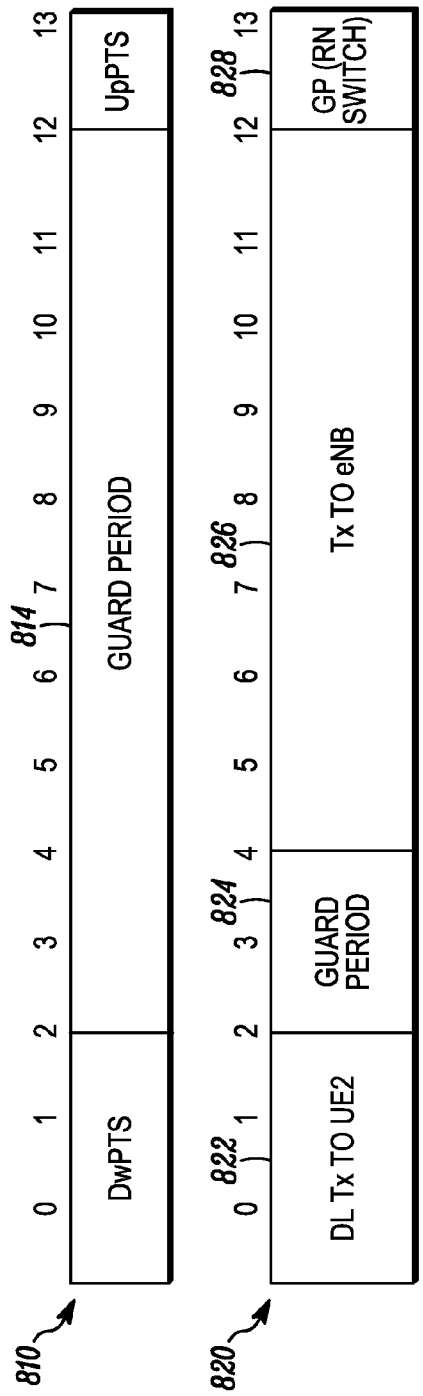
FIG. 8 illustrates a special sub-frame configuration enabling the RN to transmit to the eNB during a UE guard period.

FIG. 8 illustrates an alternative special sub-frame from the perspective of communications between the RN, UE and eNB, the special sub-frame is configured as illustrated at special sub-frame 820. According to this alternative embodiment, symbols 0-2 of the special sub-frame 820 are allocated to the downlink pilot timeslot (DwPTS) 822 for downlink communications from the RN to the UE. Symbols 3-4 are allocated to a guard period 824 during which the RN switches from a configuration for transmitting to the UE to a configuration for transmitting to the eNB (eNB switches from a configuration for transmitting to UE served by the eNB to receiving from the RN). Symbols 5-12 are allocated for transmission to the eNB during reception duration 826. Thus according to this embodiment, the RN configures the second temporal region corresponding to the guard period 814 of the special sub-frame 810 into the first guard period 824 and transmission duration 826 during which the RN transmits to the eNB without configuring a second guard period as in FIG. 7. This configuration is possible when the RN decides to not schedule (or ignore) any uplink transmissions from the UEs it is serving. This is facilitated by the RN not scheduling uplink SRS or RACH during this interval. Therefore, the UpPTS region can be reclaimed for the RN to eNB communication and hence only a guard period may be needed. Symbol 13 is allocated to a guard period 828 during which the RN switches from a configuration of transmitting to the eNB to a configuration of transmitting to the UE. Similarly, it is possible for the eNB scheduler to schedule uplink transmissions to make the best use of the UpPTS resources.

The operation of the eNB is analogous to that of the RN: downlink communications from the eNB to the UE served by the eNB in a first temporal region DwPTS 812 symbols 0-2 of a special sub-frame 810; configuring the second temporal region of the special sub-frame corresponding to guard period 814 into first guard period symbol 3-4, uplink reception from RN during Symbols 5-12; third temporal region UpPTS 816 during which the eNB receives from its served UE. Thus, the eNB does not configure a second guard period in the second temporal region.

In one embodiment, the possible sub-frame locations for eNB to RN and RN to eNB backhaul links for the different TDD UL/DL configurations specified in 3GPP TS 36.211, v8.5.0, section 4.2 is shown in Table 1. Sub-frames 1 and 6 are special sub-frames. Note multiple sub-frames can be allocated for eNB to RN and/or RN to eNB links.

TABLE 1

Possible locations of eNB to RN and RN to eNB sub-frames.

| TDD DL/UL Configuration | eNB->RN Sub-frame | RN->eNB Sub-frame |
| --- | --- | --- |
| 0 | 1 | 6 |
|   | 6 | 1 |
| 1 | 1 | 6 |
|   | 6 | 1 |
|   | 9/4 (MBSFN for RN) | 6 |
|   | 9/4 (MBSFN for RN) | 1 |
| 2 | 1 | 6 |
|   | 6 | 1 |
|   | 8/9/3/4 (MBSFN for RN) | 6 |
|   | 8/9/3/4 (MBSFN for RN) | 1 |
| 3 | 7/8/9 (MBSFN for RN) | 1 |
| 4 | 7/8/9/4 (MBSFN for RN) | 1 |
| 5 | 7/8/9/4/3 (MBSFN for RN) | 1 |
| 6 | 9 (MBSFN for RN) | 6 |
|   | 1 | 6 |
|   | 6 | 1 |

Figure 9:
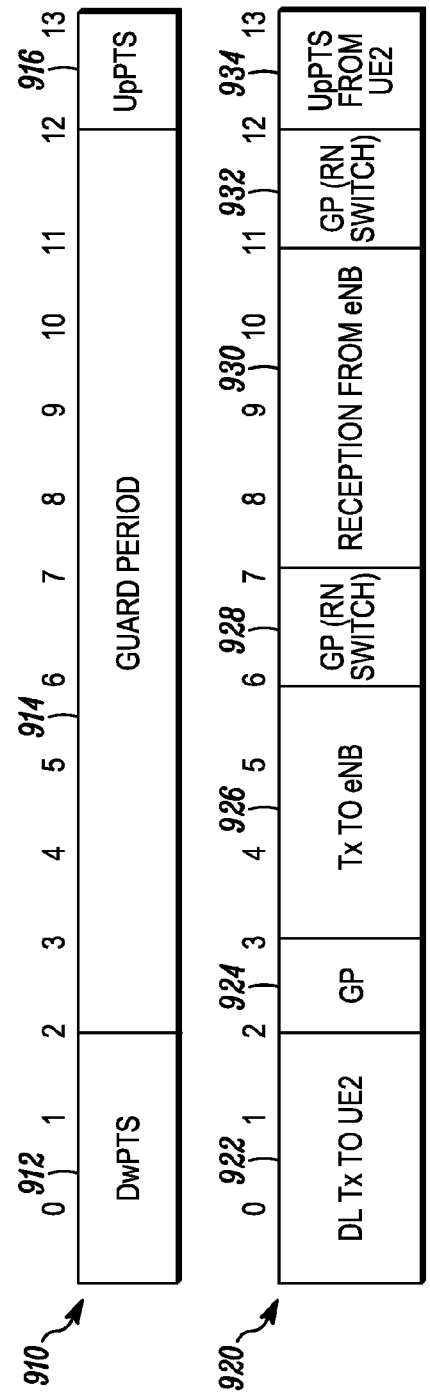
FIG. 9 illustrates a special sub-frame configuration enabling the RN to transmit to and receive from the eNB during a UE guard period.

In another implementation, illustrated in FIG. 9, the RN transmits information to and receives information from the eNB during a portion of the second temporal duration of the special sub-frame. The information communicated between the RN and eNB may be control information and/or data. As noted above, the second temporal region of the special sub-frame is configured as a guard period (GP) for communications between the RN and the UE. The configuration of the second temporal region, corresponding to the guard period for the UE, of the special sub-frame that enables the RN to transmit to and receive from the eNB is discussed below.

In FIG. 9, from the perspective of communications between the UE and RN, the special sub-frame is configured as illustrated at special sub-frame 910. Symbols 0-2 of the special sub-frame 910 are allocated to the downlink pilot timeslot (DwPTS) 712, symbols 3-12 are allocated to the guard period (GP) 914 associated with RN/UE communications, and symbol 13 is allocated to the uplink pilot timeslot (UpPTS) 916. In other embodiments more or less symbols may be allocated to the DwPTS and UpPTS than illustrated in FIG. 9.

In FIG. 9, from the perspective of communications between the RN, UE and eNB, the special sub-frame is configured as illustrated at special sub-frame 920. Symbols 0-2 of the special sub-frame 920 are allocated to the downlink pilot timeslot (DwPTS) 922 for downlink communications from the RN to the UE. Symbol 3 is allocated to a guard period 924 during which the RN switches from a configuration for transmitting to the UE to a configuration for transmitting to the eNB. Symbols 4-6 are allocated for transmission from the RN to the eNB during transmission duration 926. Symbol 7 is allocated to a guard period 928 during which the RN switches from transmission mode to reception mode. Symbols 8-11 are allocated for reception by the RN from the eNB during reception duration 930. Symbol 12 is allocated to a guard period 932 during which the RN switches from a configuration for receiving from the eNB to a configuration for receiving from the UE. Symbol 934 is allocated to the uplink pilot timeslot (UpPTS) 934 for the RN to receive uplink communications from the UE. In an alternative embodiment, the RN may receive information from the eNB during duration 926 and transmit information to the eNB during the duration 930. Thus according to this embodiment, generally, the RN configures the second temporal region corresponding to the guard period 914 of the special sub-frame 910 into the first guard period 924, a first communication duration 926 during which the RN either transmits to or receives from the eNB, a second guard period 928 during which the RN switch from transmit to receive or from receive to transmit, a second communication duration 930 during which the RN either receives from or transmits to the eNB and a guard period 932.

In one embodiment, generally, the configuration of the special sub-frame will be dictated by the base station (eNB) in a message communicated to the relay node (RN). More particularly, the eNB will indicate in a message how the RN should configure the portion of the special sub-frame corresponding to the guard period allocated for the UE served by the RN. The message could be a system configuration message like a system information block (SIB) or a higher layer configuration message such as an RRC Configuration message. Generally the configuration message may be a broadcast message or a dedicated message. Thus in some embodiments the RN receives an indication of the configuration of the second temporal region in a system configuration message from the eNB.

The eNB and RN can communicate on the backhaul using the special sub-frames on both downlink (eNB to RN) as well as uplink (RN to eNB). Additionally, it may be possible for the eNB to RN downlink transmissions via MBSFN-based signaling while the uplink (RN to eNB) transmissions occur over the special sub-frames using the invention described herein.

The eNB and RN can further cooperate with one another to improve the performance (and effectiveness of the relays) of the system. For interference coordination, the eNB and RN can divide the time-frequency resources for scheduling their respective UEs. Thus, the eNB and RN can use orthogonal (or nearly orthogonal) resources to mitigate interference. Following are some possible coordination techniques: Static-eNB silences a sub-frame (or a portion of it) by labeling it as MBSFN sub-frame or blank sub-frame (i.e., eNB transmits no signal or minimal signals) and the RN transmits to its UE during this sub-frame duration; Semi-static-eNB silences a portion of a sub-frame (e.g., x RBs with a time/frequency pattern) by not scheduling PDSCH in those resources and the RN transmits to its UE using those resources. The eNB may still have to transmit the pilots, etc., but the UE may be able to rate-match around the eNB pilots or other transmissions that cannot be turned off. This information about the interferer can be carried either in the SIB or RRC messages or explicitly signaled to the UE. If the UE is not aware of the interference on the PDSCH, hybrid automatic repeat request (HARQ) and additional error control can be used to recover from transmission errors; Dynamic (using Semi-persistent scheduling)-eNB silences a portion of a sub-frame (e.g., x RBs with a time/frequency pattern) by not scheduling PDSCH in those resources and the RN transmits to its UE using those resources. Rather than transmitting this information on a semi-static basis, the eNB can use the existing semi-persistent scheduling (SPS) grant structure to allocate and de-allocate the channel resources to the RN. It is possible to send the same information via RRC message, but this might lead to larger latency.

In a fourth possibility the RN can sense the interference by occasionally stealing resources from its transmission or reception to make measurements. For example, an RN may decide to occasionally blank out certain sub-frames though the UEs served by the RN may experience a slight performance degradation.

When possible, either increase transmit power by using a bigger power amplifier at the RN and/or reduce the eNB transmit power level where the level is determined by the number of RNs served by the eNB. In another embodiment the eNB sets its total transmit power level based on the number of RNs it serves and/or the number RNs served by adjacent cells. In another embodiment instead of the total transmit power level the eNB sets the reference symbol power level based on the number of RNs it services and/or the number or RNs serviced in adjacent cells.

In some cases, it might be advantageous to serve a UE via the RN even when the eNB to the UE link is better compared to the RN to UE link as the RN may be lightly loaded and hence can offer more resources to the UE. However, the donor or macro eNB may be the significant interferer and hence the UE connected to the RN may experience difficulty in acquiring the RN synchronization and control channels (PDCCH). One way to enable deep penetration synchronization channels (i.e., synchronization channels are enabled that can be detected by UEs with very poor C/I) is by considering a synchronous network, wherein the RN radio frames are offset by x sub-frames (e.g., one sub-frame) relative to the eNB sub-frame. Thus, the eNB, now being aware of the synch channels of the RN, can use suitable interference mitigation on the resources corresponding to the synch channels of the RN. For example, the eNB can puncture (i.e., not transmit on) the Resource Elements (Res) that if transmitted on may interfere with the synch channels of the RN. This approach can be used for other channels including the broadcast channels, etc. If RE puncturing is used, the eNB can explicitly or implicitly inform the RE puncturing information to its UEs via the PDCCH, or higher-layered signals.

One way to enable deep penetration PDCCH is by reducing the interference caused by the dominant interferer. The eNB can use suitable interference mitigation on the resources corresponding to the PDCCH of the RN. For example, the eNB can reduce the load on its PDCCH by making appropriate scheduling decisions. Furthermore, for increased penetration of RN, additional pilot signals (and >8 Control Channel Element (CCE) aggregation) may be defined in the PDCCH or PDSCH region to aid the decoding of both the control and data channels. Power boosting of 8CCE DCI format 1A+Common Reference Signal (CRS) is another way to boost PDCCH coverage. Repetition of RACH and acknowledgements (ACK) also allows for deep penetration. Channel State Information (CSI) feedback deep penetration is enabled via interference coordination or proper scheduling.

The performance gains due to Relays are sensitive to the quality of the eNB-RN link. This is due to the fact that the relays operate inband using resources that the eNB otherwise can use to serve the UEs. Therefore, the eNB-RN link should be made spectrally efficient using higher-order modulation such as 64-QAM, 256-QAM, or advanced multi-antenna techniques such as single-user multiple input multiple output (MIMO), beamforming, etc. For instance, the Modulation and Coding Scheme (MCS) for the eNB-RN can be based upon a plurality of modulation types comprising Quadrature Phase Shift Keying (QPSK), 16-QAM (Quadrature Amplitude Modulation), 64-QAM, 128-QAM, 256-QAM., etc. The MCS tables for the RN may be expanded to include higher spectral efficiency values, including, for example, 6 bits per second per Hertz (bps/Hz), 6.33 bps/Hz, and so on up to 8 bps/Hz. The transition spectral efficiency from 64-QAM to 256-QAM may be determined based on the simulations studies. For simplicity, additional new MCS values can be appended to the MCS tables defined in Rel-8 to accommodate the new modulation orders. In another simple approach, the new MCS values can replace some of the MCS values in the MCS table defined in Rel-8 so that the number of bits used to signal the MCS index remains unchanged (e.g., in Rel-8 5-bit MCS is used). In another embodiment, an MCS table may be defined without MCS corresponding to QPSK modulation order. In yet another embodiment, an MCS table can be defined wherein the Modulation order associated with an MCS index is a function of one or more quantities, including the number of allocated resource blocks, etc. It is also possible to signal the Modulation order and transport block size separately for the eNB-RN link.

The above embodiments are applicable to both TDD and FDD systems supporting Relay Nodes, Femto-cells, Home-NBs, and Home-eNBs.

While the present disclosure and the best modes thereof have been described in a manner establishing possession and enabling those of ordinary skill to make and use the same, it will be understood and appreciated that there are equivalents to the exemplary embodiments disclosed herein and that modifications and variations may be made thereto without departing from the scope and spirit of the inventions, which are to be limited not by the exemplary embodiments but by the appended claims.

What is claimed is:

1. A time division duplex relay node comprising:
a transceiver coupled to a controller;
the relay node configured to
transmit an indication of a configuration of a special sub-frame in a system information broadcast message,
transmit downlink pilot timeslot information to a user terminal in a first temporal region of the special sub-frame,
receive from a base station during a second duration of a second temporal region of the special sub-frame,
wherein the second temporal region is a guard period for communications between the relay node and the user terminal,
a first duration of the second temporal region is a first guard period, and
a third duration of the second temporal region is a second guard period.

2. The relay node of claim 1, wherein the special sub-frame corresponds to a sub-frame 1 in a radio frame comprising a plurality of sub-frames 0-9.

3. The relay node of claim 1, wherein the special sub-frame corresponds to a sub-frame 6 in a radio frame comprising a plurality of sub-frames 0-9.

4. The relay node of claim 1, the special sub-frame is a portion of a radio frame that is configured as time division duplex uplink/downlink configuration 0.

5. The relay node of claim 4, the special sub-frame is a portion of a radio frame that is configured as time division duplex uplink/downlink configuration 4.

6. A time division duplex relay node, comprising:
a transceiver coupled to a controller;
the relay node configured to
transmit an indication of a configuration of a special sub-frame in a system information broadcast message,
transmit downlink pilot timeslot information to a user terminal in a first temporal region of the special sub-frame, and to
transmit to a base station during a second duration of a second temporal region of the special sub-frame,
wherein the second temporal region is a guard period for communications between the relay node and the user terminal,
a first duration of the second temporal region is a first guard period, during which there are no communications between the relay node and the base station, and
a third duration of the second temporal region is a second guard period, during which there are no communications between the relay node and the base station.

7. A time division duplex relay node comprising:
a transceiver coupled to a controller;
the relay node configured to
transmit an indication of a configuration of a special sub-frame in a system information broadcast message,
transmit downlink pilot timeslot information to a user terminal in a first temporal region of the special sub-frame,
transmit to a base station during a second duration of a second temporal region of the special sub-frame,
wherein the second temporal region is a guard period for communications between the relay node and the user terminal,
a first duration of the second temporal region is a first guard period.

8. A relay node operating in a time division duplex system, the relay node comprising:
a transceiver configured to transmit downlink pilot timeslot information to a user terminal in a first temporal region of a special sub-frame,
the special sub-frame having a second temporal region, the second temporal region is configured as a guard period during which there are no communications between the relay node and the user terminal,
a first duration of the second temporal region configured as first guard period during which there are no communications between the relay node and the base station,
the transceiver configured to communicate with a base station during a second duration of the second temporal region of the special sub-frame, a third duration of the second temporal region configured as a second guard period during which there are no communications between the relay node and the base station, and the special sub-frame having a third temporal region.

9. The relay node of claim 8,
the transceiver configured to receive from the base station during the second duration of the second temporal region of the special sub-frame.

10. The relay node of claim 8,
the transceiver configured to transmit to the base station during the second duration of the second temporal region of the special sub-frame.

11. The relay of claim 8,
the transceiver configured to communicate with the base station during a fourth duration of the second temporal region of the special sub-frame,
a fifth duration of the second temporal region configured as a third guard period.

12. A time division duplex relay node comprising:

a transceiver coupled to a controller;

the relay node configured to transmit downlink pilot timeslot information to a user terminal in a first temporal region of a special sub-frame, communicate with a base station during a second temporal region of the special sub-frame, receive an indication of the configuration of the second temporal region in a system configuration message before transmitting, and transmit an indication of the configuration of the special sub-frame in a broadcast message, wherein the second temporal region is a guard period during which there are no communications between the relay node and the user terminal.

* * * * *